United States Patent
Dong et al.

(10) Patent No.: US 11,460,927 B2
(45) Date of Patent: Oct. 4, 2022

(54) AUTO-FRAMING THROUGH SPEECH AND VIDEO LOCALIZATIONS

(71) Applicant: DTEN, Inc., San Jose, CA (US)

(72) Inventors: Jinxin Dong, San Jose, CA (US); Sally Tung, San Jose, CA (US); Yuchen Zhou, San Jose, CA (US); Wei Liu, San Jose, CA (US); Jin Guo, San Jose, CA (US)

(73) Assignee: DTEN, Inc., San Jose, CA (US)

( * ) Notice: Subject to any disclaimer, the term of this patent is extended or adjusted under 35 U.S.C. 154(b) by 0 days.

(21) Appl. No.: 17/001,089

(22) Filed: Aug. 24, 2020

(65) Prior Publication Data

US 2021/0294424 A1    Sep. 23, 2021

Related U.S. Application Data

(60) Provisional application No. 62/991,852, filed on Mar. 19, 2020.

(51) Int. Cl.
  *G06F 3/01*   (2006.01)
  *H04N 5/232*  (2006.01)
  (Continued)

(52) U.S. Cl.
  CPC .............. *G06F 3/017* (2013.01); *G06F 3/011* (2013.01); *G06F 3/16* (2013.01); *G06V 20/40* (2022.01);
  (Continued)

(58) Field of Classification Search
  None
  See application file for complete search history.

(56) References Cited

U.S. PATENT DOCUMENTS

| 8,131,543 B1 * | 3/2012 | Weiss .................... G10L 25/78 |
| | | 704/226 |
| 2007/0078649 A1 * | 4/2007 | Hetherington ...... G10L 21/0216 |
| | | 704/226 |

(Continued)

FOREIGN PATENT DOCUMENTS

WO    WO-2009042579 A1 *  4/2009  ............. G06F 3/017

OTHER PUBLICATIONS

Hoang Do, Harvey F. Silverman, Ying Yu. ("A Real-Time SRP-PHAT Source Location Implementation Using Stochastic Region Contraction (SRC) on a Large-Aperture Microphone Array") (Year: 2006).*

(Continued)

*Primary Examiner* — William L Bashore
*Assistant Examiner* — Gabriel Mercado
(74) *Attorney, Agent, or Firm* — Lempia Summerfield Katz LLC (57) ABSTRACT

A system automatically frames locations by detecting a user's presence within a virtual detection space. The system detects sound in the detection space and converts the sound into electrical signals. The electrical signals are converted into a digital signals at common or periodic sampling rates. The system identifies speech segments in the digital signals and attenuates noise like components within or adjacent to them. The system identifies the physical locations of a speech source generating the speech segments and automatically adjusts a camera framing based on the estimated location of the active speech source generating the speech segments.

23 Claims, 6 Drawing Sheets

(51) Int. Cl.
*G06V 20/40* (2022.01)
*G06V 40/10* (2022.01)
*G06F 3/16* (2006.01)
*G10L 13/02* (2013.01)
*G10L 15/08* (2006.01)

(52) U.S. Cl.
CPC .............. *G06V 40/10* (2022.01); *G10L 13/02* (2013.01); *G10L 15/08* (2013.01); *H04N 5/23299* (2018.08)

(56) References Cited

U.S. PATENT DOCUMENTS

| | | | |
|---|---|---|---|
| 2011/0075851 A1* | 3/2011 | LeBoeuf | H04R 29/00 381/56 |
| 2012/0062729 A1* | 3/2012 | Hart | H04N 7/142 348/135 |
| 2014/0156833 A1* | 6/2014 | Robinson | H04L 43/12 709/224 |
| 2014/0195577 A1* | 7/2014 | Nikitin | H03H 11/1256 708/304 |
| 2015/0269954 A1* | 9/2015 | Ryan | G10L 15/28 704/233 |
| 2016/0078873 A1* | 3/2016 | Wang | G10L 19/012 704/203 |
| 2019/0025400 A1* | 1/2019 | Venalainen | H04R 3/005 |
| 2019/0035431 A1* | 1/2019 | Attorre | G11B 27/036 |
| 2019/0158733 A1* | 5/2019 | Feng | H04N 5/23299 |
| 2019/0173446 A1* | 6/2019 | Knode | H03G 3/32 |
| 2019/0341054 A1* | 11/2019 | Krupka | G06V 10/454 |
| 2020/0092519 A1* | 3/2020 | Shin | G06N 3/006 |
| 2020/0412772 A1* | 12/2020 | Nesta | H04S 7/302 |

OTHER PUBLICATIONS

Huang Do_Stochastic Region Contraction (Year: 2006).*

* cited by examiner

AUTO-FRAMING THROUGH SPEECH AND VIDEO LOCALIZATIONS

PRIORITY CLAIM

This application claims the benefit of priority from U.S. Provisional Application No. 62/991,852, filed Mar. 19, 2020, titled "Auto-framing Through Speech and Video Localizations", which is herein incorporated by reference.

BACKGROUND OF THE DISCLOSURE

Technical Field

This application relates to auto-framing, and specifically to an integrative control system that optimizes framing through speech and video localizations.

Related Art

Video conferencing typically involves sharing images among geographically separated participants. Through cameras and microphones, the systems capture video and relay it to other participants. The simultaneous content shared among the participants is often constrained by the setup of the equipment. For example, many users are not familiar with camera and microphone setups. Thus, it is often not properly configured.

Manual control of video conferencing equipment during a meeting does not help as instructions are often complex, it requires technical know-how, and changing setups during meeting can be distracting. Often, the framing controls are not intuitive and many systems cannot track active speakers through an entire meeting.

DETAILED DESCRIPTION

An intelligent video conferencing control system and process (referred to as a system or systems) provide a natural and seamless tracking while improving the perceptual quality of speech shared with participants. The systems provide autonomous audio and video control by acquiring, conditioning, assimilating, and compressing digital audio and video content and transmitting that content to remote destinations. Using integrative technology that includes a speech locator and an optional video locator, the systems process speech to provide automatic image and audio control while providing simultaneous communication among geographically separated participants.

Some systems also allow users across networks to work together on content and documents that are simultaneously displayed to all users as though they were all gathered around a physical whiteboard. These alternative systems allow a single set of files at one location to be accessed and modified by all participants. By the systems' speech enhancements, the systems improve the perceptual speech quality of voiced speech by removing unwanted noise and dampening background noise received by an array of input devices. Some systems do not remove the entire noise from the signals to maintain the natural sound conditions participants are accustom to. The devices may be configured to sense the directional response of participants voices and voice patterns by processing the time difference of arrival of speech, exclusively or in part. Control of the video conferencing system is based on portions of the aural spectrum that are further compressed and transmitted over one or more networks that include a wide area network or the Internet, for example.

Some systems model spectral and temporal characteristics of undesired signals and remove random transient (e.g., non-periodic signals) and/or persistent signals (e.g., periodic or continuous signals) that correspond to one or more undesired signal characteristics, such as noise. When the undesired characteristics are detected, they are substantially removed or dampened rendering a cleaner sound. It also improves the perceptual quality of voiced signal. The processed voice and desired signals enable the systems to automatically control and adjust the system, such as the panning, tilting, and zooming of one or more cameras that may be part of the video conferencing system. The control ensures high resolution views, clean and improved perceptual quality speech, and cleaner desired sounds that are conveyed to the geographically remote participants without distracting, burdening, or requiring participants to adjust any equipment. Further, the systems are self-calibrating, making it unnecessary for users to calibrate or recalibrate the systems when they are first used, used in different surroundings, and/or used in new environments.

Figure 1:
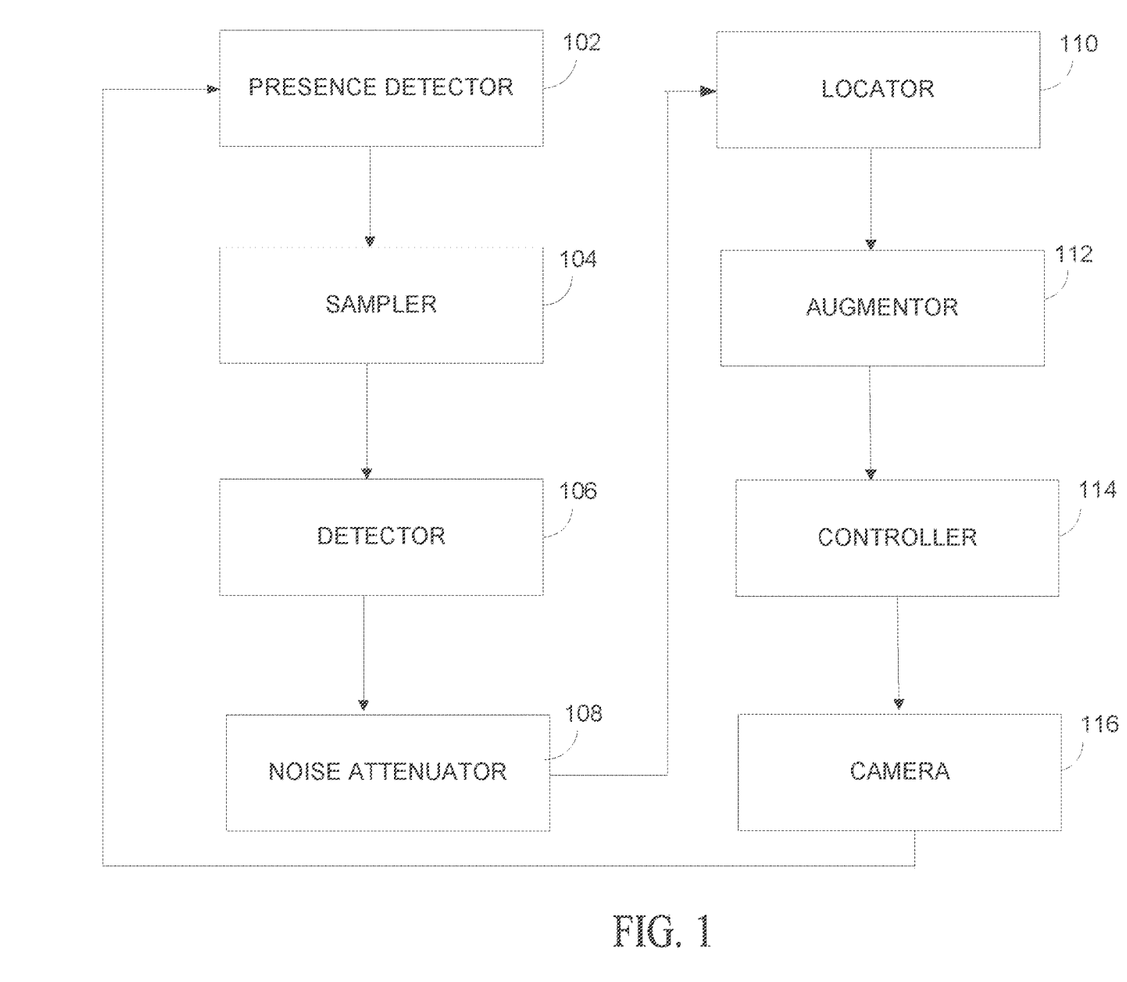
FIG. 1 is an audio and video localization system.

A touchless user interface enables all users to control the systems with little or no training regardless of their backgrounds or speaking styles. The systems are immediately accessible, and in some systems, provide visual cues of gesture commands and/or voice commands that may frame, view, track and enhance the accuracy of focusing on the presenters automatically. FIG. 1 is a flow diagram illustrating some of the functionality of the touchless interface. As shown FIG. 1 or FIG. 6, optional proximity, optical, and/or voice detectors detect the participants presence, and in some applications, measure or estimate the distance of the participants (e.g., the target(s)) in a virtual interaction space without physical contact with one or more detectors 102. The detectors 102 interface or are a unitary part of the one or more pan-tilt-zoom cameras (referred to as a camera or cameras 116) control systems in some integrated systems such as the system shown in FIG. 4, and standalone systems (e.g., self-contained) in other configurations. The detectors 102 detect the presence participants and the number of participants when they enter the interactive space.

Upon a detection, the systems transition from a stand-by state (e.g., the dormant state) to an interactive state (e.g., the active state) in response to the detection. The transition occurs in real-time (e.g., waking-up at the same rate the detection occurs, with no delay) in some systems, and in near-real time in other systems. Delay is minimized in some systems by loading application software in the background. In these systems, background loading improves system responsiveness eliminating a move and wait operating state that is perceived by some users to be slow and sluggish, and thus, impractical for commercial uses.

Figure 4:
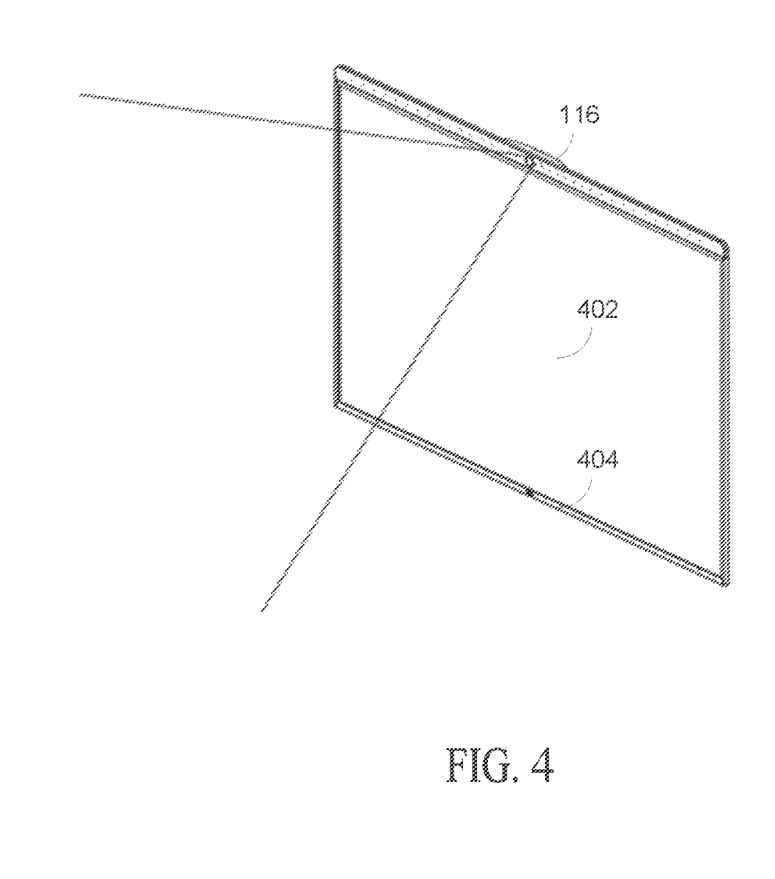
FIG. 4 is a conferencing system.

Some alternative systems render optional acknowledgement notifications such as audible acknowledgements made through a synthesized sound through a speech synthesis engine (e.g., such as a high fidelity text-to-speech engine that converts a textual acknowledgement into a voiced speech) and/or visual acknowledgements rendered on a display 402 shown in FIG. 4. The optional acknowledgement confirms the active state before further interactions occur. The detection of a user's presence in the virtual interaction space triggers one or more auto framing modes (e.g., such as a solo mode, a debate mode, and/or a panel mode) that frames the participants present in the interactive space and continually adjusts the framing modes and framing areas as more participants enter and leave the interactive space. Some alternate systems allow users to partition the interactive space into blocking areas or blocking regions too by voice commands that prevent the systems from tracking the users in the designated area and prevent the systems from tracking images in those areas. Some of these alternate systems dampen, distort, and/or block audio and images from the blocking areas and blocking regions too by attenuating, distorting, and/or dampening the input that is received from or primarily from those areas. Localization of those areas maybe identified by the systems described herein or by identifying the location of those areas by monitoring then by unidirectional microphones that may be included in one or more microphone arrays 404. In some systems, sound or speech is either not captured, or alternately, is substantially dampened by removing or subtracting the aural or speech signals received from these areas from the aggregated audio signal summed from the microphone array 404 before the aggregated audio signal is transmitted to the geographically separated participants.

Through algorithms and trained classifiers, the systems auto-frames participants that are captured by the camera 116 by the number and location of the participants in the interactive space. Some systems focus on active participants that may be identified by their active voice and/or frequent gestures regardless if they are a near-side or far-side talkers. Some alternative systems zoom in on active participants (e.g. enlarging their captured images) while optimizing the systems framing to include all of the participants present in the interactive space that is also based on the number of participants and their locations. The camera 116 naturally re-adjusts its pan, tilt, and/or zoom settings and zooms in on participants, at a natural and periodic rate based on the number of active speakers and augmented by video data so little is missed within the interactive space, meetings include all participants in the captured video images, and the meetings are more intimate. In these systems, participants seem closer to all of the viewers by excluding non-active spaces from the video images transmitted among the various geographically separated participants in the meetings through pan, tilt, and/or zoom settings.

With presence detected by a presence detector 102 and sound captured and sampled via a cache and sampler 104, the systems detect noise and/or voice via a detector 106 and enhance voiced speech by dampening undesired signals such as the level of background noise and other noises detected from the input via a noise attenuator 108. Speech comprises voiced speech such as vowels and unvoiced speech such as constants. Voiced speech has a regular harmonic structure; meaning it has harmonic peaks weighted by a spectral envelope. Unvoiced speech lacks a harmonic structure. Aural signals include non-periodic noises, periodic noises, and voiced and/or unvoiced speech.

Figure 2:
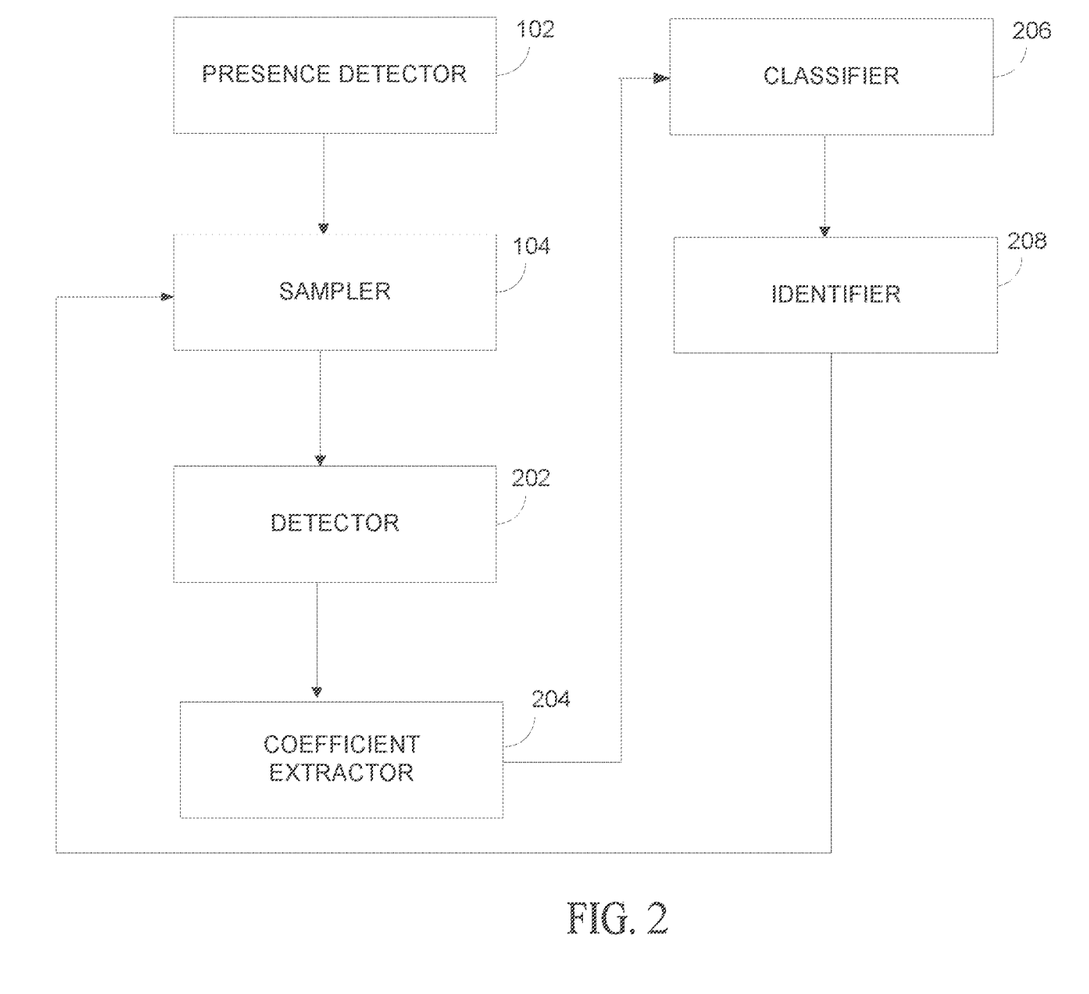
FIG. 2 is a noise detector and speech segment identifier.

In FIG. 2, a voice activity detector identifies speech. Speech may be identified by sampling the input at a predetermined sampling rate by a sampler 104 after presence is detected by the presence detector 102. At periodic intervals such as at about fourth-tenths of a second, a coefficient extractor 204 transform the sampled inputs into Mel frequency cepstral coefficients that extracts features from the sampled input. Using a deep neural network 206, the system classifies the Mel coefficients as speech or noise and identifies a human presence via an identifier 208 by the presence or absence of voiced and unvoiced speech. Thereafter, the speech and/or noise segments or bins are marked as voice or noise in the aural signal and a human presence is identified.

Figure 3:
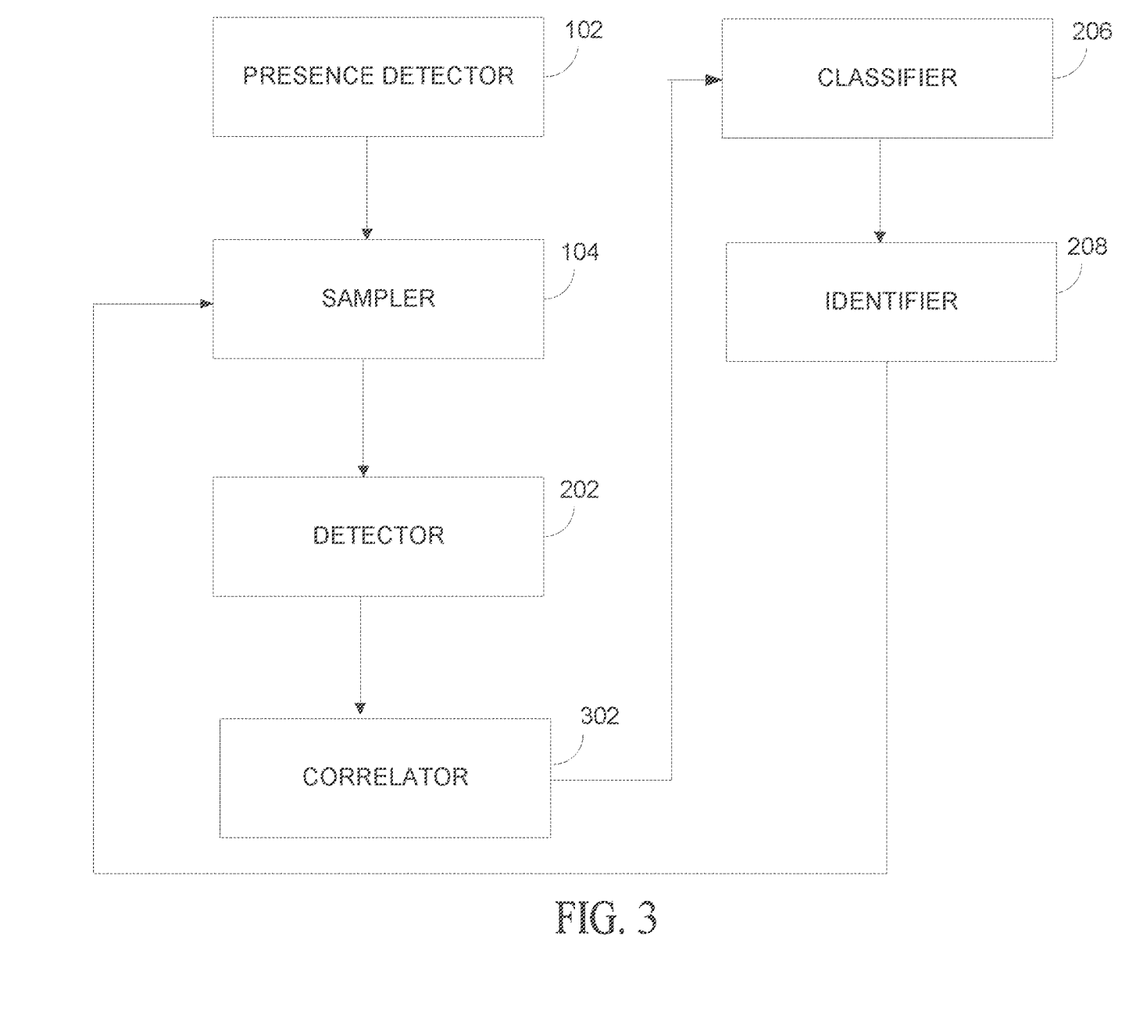
FIG. 3 is an alternate noise detector and speech segment identifier.

In an alternative systems, voice and noise segments are identified by an identifier 208 when the sampled input signal is correlated with known noise events and/or is uncorrelated with speech by a correlator 302. A correlation between the spectral and/or temporal shape of a sampled signal and a previously modeled shape or between previously stored attributes of noise and/or modeled signal attributes of voiced and unvoiced speech may identify a potential noise segment and/or speech segment. When the correlation or uncorrelation levels exceed a predetermined threshold value, the signal segment is classified by the classifier 206 and marked as noise or as an undesired signal and identifies a human presence. When speech is not identified, some alternate systems measure the nearly continuous noise that is present near each of the microphones that comprise the microphone array 404 to estimate the background noise. The background noise measurement may be updated continuously when voice and unvoiced segments are not detected and at some intervals not measured when transient noise events are identified. Thereafter, it may be dampened in part to improve the perceptual quality of speech. A transient noise event is identified when noise measurement exceeds an average measurement or a median measurement of the prior background noise measurements.

With sampled signals marked, a noise attenuator 108 dampens or attenuates the noise (including portions of the background noise) and noise like components from the sampled signal regardless of the amplitude of the incoming signal. When the identifier 208 marks noise or undesired signals, a modeler (not shown) models the temporal and spectral components of the noise and undesired signals and generates a noise and/or undesired signal model, or alternatively, store attributes of those conditions in a data warehouse 606 (shown in FIG. 6) that is thereafter used to detect noise, identify a human presence, and in some systems improve the perceptual quality of speech that is transmitted to the various geographically separated participants. By updating the models continuously or periodically, the systems adapt to changing conditions naturally in a perceptually undetectable manner and do not require manual or scheduled calibrations or recalibrations.

With noise and undesired signals dampened, a locator 110 executes an acoustic localization through the microphone array 404 that comprises several microphones equidistant from each other. The time difference of arrival from between microphones is processed to determine the direction of arrival of the speech signals.

Using a steered response power with phase transform, the system estimates the time difference of arrival between microphones of the microphone array 404. The steered response power is a real-valued spatial vector, which is defined by the field of view (a.k.a., a view of the interactive space) of a specific array. A high maxima in the steered response power estimates the location of the sound source in the field of view. The steered response power is computed for each direction sensed by microphone pairs that comprise the microphone array 406 to generate a cumulative generalized cross-correlation with phase transform value across the pairs of microphones at the time delays associated with the established sensing directions. The phase transform effectively weighs the generalized cross correlation processed to determine the time difference of arrival.

By computing steered response power for points in the interactive space, a steered response power image is generated that renders images of the whole observable interactive space. The rendered images show signal energy distributions and the associated reverberation effects. To reduce the processing bandwidth processed to extract the global maximum estimation to locate the high maxima of the steered response power, the systems apply a stochastic region contraction that iteratively reduces the search volume for the high maxima. The process begins by searching the entire interactive space or the whole field of view, and stochastically analyzes the function of the volume by selecting a predetermined number of points, and thereafter, contracting the volume into smaller volumes containing the desired high maxima, which continues recursively until the high maxima is located. The algorithm is thereafter repeated continuously or periodically to ensure speech source locations are precisely identified and updated in memory and ensures that the algorithm precisely reflects and tracks the changing speech sources, monitored conditions, and dynamics of the interactive space.

To enhance accuracy, some locators 110 generates estimates of the high maxima in each of the regions monitored by the microphone pairs along with a measurement of their uncertainties. Once a high maxima is estimated, the estimate is weighted by applying a weighted average, with more weight given to estimates associated with higher certainties. Like steered response power with phase transform processes, this algorithm is recursive and runs in real-time processing the previously calculated state and an associated uncertainty matrix continuously and updating speech source localizations continuously.

In some systems, an optional agumentor 112 supplements or confirms the estimate of the active speaker's (e.g., the sound source's) location. The agumentor 112 processes video streams rendered from single or multiple cameras 116 that are processed by machine learning and tracking algorithms. In FIG. 1, the one or more machine learning algorithms detect, classify, and track the active speaker's (e.g., the human talkers) that interact with the system to confirm their physical locations. Classifiers (not shown) within the optional augmentors 112 identify the active speaker(s), and with respect to the other objects captured in the images, precisely discern their location(s). An exemplary machine learning algorithm trains active speaker classifiers to detect image objects that reflect an active speaker and in alternate systems active participants. The detections are triangulated in three dimensions to render multiple views of the image objects. Based on repeated training of the multiple views of the object shown in the video images captured by the camera(s) 116, the machine learning algorithms train the classifiers that detect key points of the image object and mark the captured objects as the active speaker. In some systems, the processing described in this disclosure occurs in real-time. The term real-time is intended to broadly encompass systems that process information at the same rate they receive data, enabling them to direct or control a process just like an automatic pilot and the speech locators described herein.

Rather than relying on a single machine learning algorithm to detect and classify active human speakers (or alternately, active participants), some optional augmentors 112 also process the video images using a second (different) type of machine learning algorithm (different from the first) in parallel to improve the accuracy and speed of the system's active speaker recognitions. In these augmentors 112, another optional classifier predicts bounding boxes enclosing a desired participants head and/or mouth using dimensions and clusters as anchor boxes to predict active speakers recognition. The systems predict four coordinates for each bounding box (e.g., each participant's mouth/head tracked). Applying a linguistic regression, a predicted object score is generated. When a bounding box's object score exceeds a predetermined threshold, a feature extraction is executed by a feature extractor processing the video images using successive 3×3 and 1×1 convolutional layers (e.g., fifty-three convolutional layers in an exemplary machine learning algorithm) until a predetermined mean-squared error is achieved. Each of the second-type of gesture classifiers are trained using full video images captured by the camera(s) 116 using a multi-scaling processes to render more trained classifiers that render recognition predictions and confidence scores. Once trained, the classifiers process the captured video by processing video images in real-time.

In operation, the extracted features of the active speakers in the video image are processed by the various types of classifiers and the identifications with the highest confidence score are selected by the processor 602 (shown in FIG. 6) and designated as the active speaker. Thereafter, the optional augmentor 112 discerns their precise location based on their positions relative to other objects captured by the video image. In some augmentors 112, the locations of the other objects are previously known in the interactive space and stored in the data warehouse 606. In some augmentor 112, a boosting configuration is used in which classifiers are serially combined to reduce residual error. To improve system accuracy, machine learning, detections are repeated at periodic time intervals during active conferencing time periods. In some systems, the systems continuously re-find or identify new active speaker objects (e.g., execute a completely new locating/detecting process) and in other systems, in a predetermined time periods such as every five-to-ten seconds before confirming or identifying new locations of the one or more active speakers.

Based on the predictions of the locator 110 and optional augmentor 112, the estimated location of the human sound source is known. When the predictions vary, a composite estimate may be derived. In these alternate systems, the estimates are updated using a weighted average, with more weight given to the estimates that have a higher certainty and less weight given to the estimates having a lower certainty. Using the various estimates, a weighted average provides an estimate of the active speech source location.

With the active speakers identified, modes are selected and control signals are generated by a controller that drives the one or more pan-tilt-zoom cameras 116. The camera 116 automatically adjusts the modes and framing of participants by adjusting the camera 116 as participants actively speak and move about or come in and out of the interactive area in response to the control signals. By panning, tilting and/or zooming, the controller 114 ensures that all meeting participants are captured in the camera's video images, and in some systems, focus in on or enlarge video images of the active speakers. The systems may focus on one speaker in the camera frame (known as a solo mode) when there is only one participant. The systems may focus on two to three speakers (known as a debate mode) when there are two to three participants. The speakers may focus on four or more speakers (known as a panel mode) when there are more than three participants.

Figure 5:
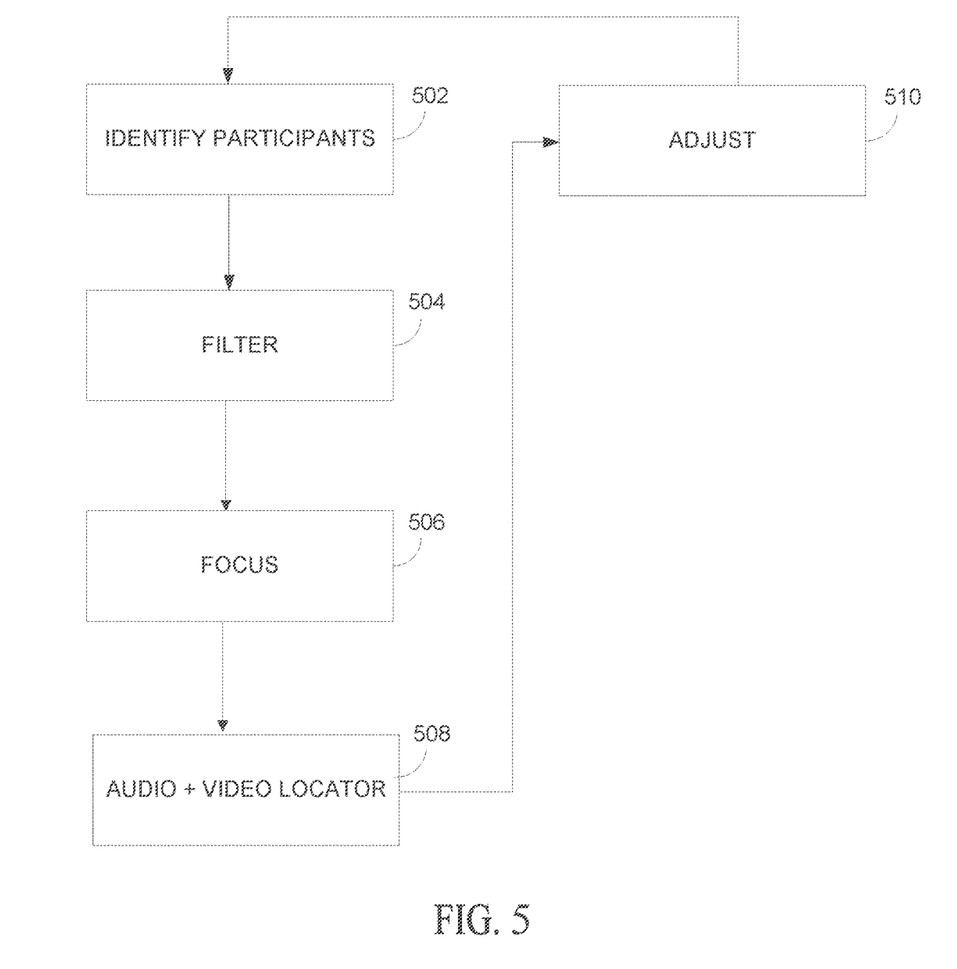
FIG. 5 is an auto-framing process.

In operation, the systems identify meeting participants and filters out incorrect predictions in 502 and 504 as disclosed in U.S. Provisional Application 62/900,232 titled Gesture Control Systems, that is incorporated by reference. Supplemental or alternative functionality may be rendered by OpenPose and Yolov3 tracking software, for example in alternate systems. The systems detect the number and location of the participants in an interactive space and focuses the camera(s) at 506. Using audio locator technology and the optional video locator technology described herein, the system selects modes and automatically adjusts the camera's framing gradually (e.g., not abrupt) by adjusting the pan, tilt, and/or zoom settings of the camera 116 at a natural rate (e.g., scheduled rate), and in some alternate systems, share perceptually improved speech with various geographically separated participants. The automatic and gradual adjustments occur asynchronously as people more about the interactive space or come into it or out of the interactive space. The process is recursive and continuously monitors the interactive space and adjusts the video framing. It optimizes video framing by locating active speakers and making viewers feel closer to their geographically remote participants.

Figure 6:
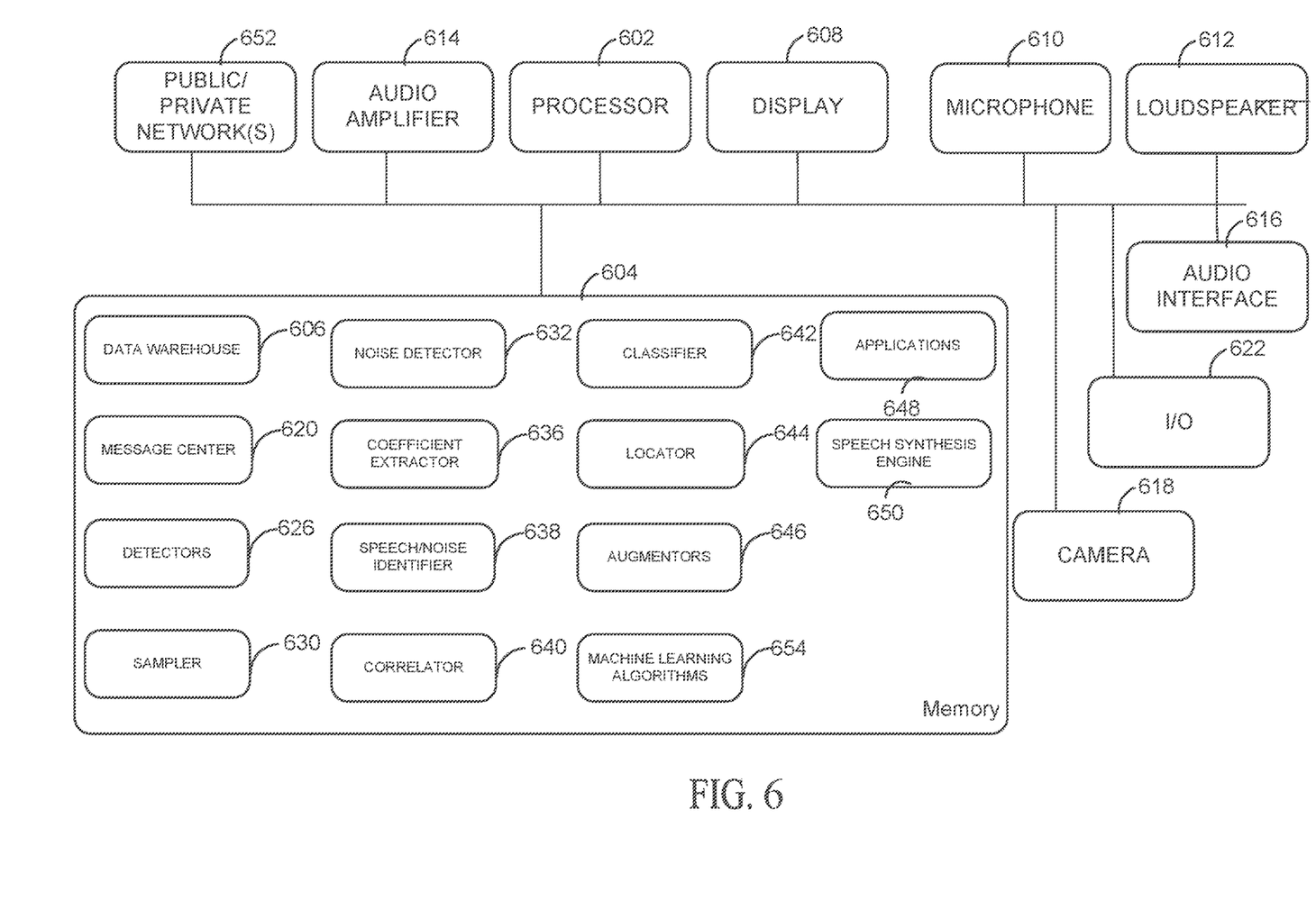
FIG. 6 is an auto framing and video conferencing system.

FIG. 6 is a block diagram of touchless user interface that may execute the process flows, functions, and systems described above and those shown in FIGS. 1-5. The system comprises a processor unit or graphical processor unit 602, a non-transitory media such as a memory 604 (the contents of which are accessible by one or more processors and/or graphical processors 602), a public/private network 652, a data warehouse 606, a display 608, a microphone array 610, a loudspeaker 612, an audio amplifier 614 an audio interface 616, one or more pan-zoom-tilt cameras 618, a message center 620, and an I/O interface 622. The I/O interface 622 connects devices and local and/or remote applications such as, for example, additional local and/or remote monitored cameras 618. The memory 604 stores instructions, which when executed by the processor 602, causes the system to render some or all of the functionality associated with the systems described herein. The memory 604 stores instructions, which when executed by the processor 602, causes the system to automatically render functionality and hardware that enables the static and dynamic auto-framing and/or zooming events, message centers 620, proximity, optical, and/or voice activity detectors 626, sampler 630, noise detector 632, noise attenuator 634, coefficient extractor 636, speech/noise identifier 638, correlator 640, classifier 642, locator 644, augmentors 646, machine learning algorithms 654, and one or more auto-framing based application software 648. Some functionality may be rendered by OpenPose and Yolov3 and CSRT tracking software, and speech synthesis engines for example in alternate systems. In yet another alternate system, the non-transitory media provided functionality is provided through cloud storage. The term cloud storage is intended to broadly encompass hardware and software that enables data to be maintained, managed, and backed up remotely and made available to users over a network (typically a publicly available distributed network like the Internet). In this system, cloud storage provides ubiquitous access to the auto-framing and perceptually improved processes that improve speech. The resources including audio and video locators, and tracking and higher-level services that can be rapidly provisioned over a public network. Cloud storage allows for the sharing of resources to achieve coherence services across many touchless systems at many locations and provides economies of scale.

The memory 604 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 604 may comprise a single device or multiple devices that may be disposed on one or more dedicated memory devices or disposed on a processor or other similar device. The term "engine" is intended to broadly encompass a processor or a portion of a program that executes or supports events such as the static and dynamic recognition events and processes. When functions, steps, etc. are said to be "responsive to" or occur "in response to" another function or step, etc., the functions or steps necessarily occur as a result of another function or step, etc. It is not sufficient that a function or act merely follow or occur subsequent to another.

Alternate systems are not limited to the particular hardware and machine learning algorithms described above. Other suitable hardware and machine learning algorithms can be used. Furthermore, the systems are not limited to physically static systems. Rather, the systems can be used in mobile devices and operate across distributed networks. The systems illustratively disclosed herein suitably may be practiced in the absence of any element (including hardware and/or software), which is not specifically disclosed herein. They may operate in the absence of those elements. Further, the various elements described in each of the many systems described herein is regarded as divisible with regard to the individual elements described, rather than inseparable as a whole. In other words, alternate systems encompass any variation and combinations of elements described herein and may be made or used without the various elements described (e.g., they may operate in the absence of one or more of the elements disclosed herein or shown in FIGS. 1-6).

An intelligent camera control system and process provides a natural and seamless active speaker tracking while improving the perceptual quality of speech shared with geographically separated participants. The systems provide autonomous audio and video control by acquiring, conditioning, assimilating, and compressing digital audio and video content and transmitting that content to remote destinations. Using integrative technology that include an active speech locator and an optional video locator, the systems process speech to provide automatic image and audio control while providing simultaneous communication among geographically separated participants through multimodal operations.

The subject-matter of the disclosure may also relate, among others, to the following aspects (the aspects are referenced by numbers):

1. A computer implemented method of controlling an electronic device in an absence of a physical contact with the electronic device, comprising:

detecting a user's presence within a virtual detection space of a camera while the electronic device is in a standby state;

transitioning the electronic device to an interactive state when the user's presence is detected;

detecting sound in the detection space and converting the sound into electrical signals;

converting the electrical signals into a digital signals at periodic intervals;

identifying speech segments in the digital signals;

attenuating noise components in the digital signals;
locating a physical location of a speech source generating the speech segments; and
adjusting the camera automatically on the speech source generating the speech segments.

2. The computer implemented method of aspect 1 further comprising rendering an acknowledgement in response to the virtual detection via a speech synthesis engine.

3. The computer implemented method of any of aspects 1 to 2, further comprising converting the digital signals into a plurality of cepstral coefficients.

4. The computer implemented method of aspect 3 further comprising identifying a human presence in response to processing the cepstral coefficients.

5. The computer implemented method of any of aspects 1 to 4 where the speech segments are identified by correlating spectral shapes of the digital signals attributed with voiced and unvoiced speech.

6. The computer implemented method of any of aspects 1 to 5 where the locating a physical location of a speech source comprises an acoustic localization executed by an acoustic locator.

7. The computer implemented method of aspect 6 where the locating a physical location of a speech source comprises a video localization executed by a video locator.

8. The computer implemented method of aspect 7 where the locating a physical location of a speech source is based on detecting a maximum in a steered response power segment.

9. The computer implemented method of aspect 6 where the locating a physical location of a speech source is based on detecting a maximum in a steered response power segment.

10. An electronic device, comprising:
    a display;
    a processor in communication with the display; and
    a computer program stored in a non-transitory memory executed by the processor that causes actions to be carried out through instructions for:
    detecting a user's presence within a virtual detection space of a camera while the electronic device is in a standby state;
    transitioning the electronic device to an interactive state when the user's presence is detected;
    detecting sound in the detection space and converting the sound into electrical signals;
    converting the electrical signals into a digital signals at periodic intervals;
    identifying speech segments in the digital signals;
    attenuating noise like components in the digital signals;
    locating a physical location of a speech source generating the speech segments; and
    adjusting the camera automatically on the speech source generating the speech segments.

11. The electronic device of aspect 10 further comprising instructions for rendering an acknowledgement in response to the virtual detection via a speech synthesis engine.

12. The electronic device of any of aspects 10 to 11 further comprising instructions for converting the digital signals into a plurality of cepstral coefficients.

13. The electronic device of aspect 12 further comprising instructions for identifying a human presence in response to processing the cepstral coefficients.

14. The electronic device of any of aspects 10 to 13 where the speech segments are identified by correlating spectral shapes of the digital signals attributed with voiced and unvoiced speech.

15. The electronic device of any of aspects 10 to 14 further comprising instructions where the locating a physical location of a speech source comprises an acoustic localization executed by an acoustic locator.

16. The electronic device of any of aspects 10 to 15 where the locating the physical location of a speech source comprises a video localization executed by a video locator.

17. The electronic device of aspect 16 where the locating a physical location of a speech source is based on detecting a maximum in a steered response power segment.

18. The electronic device of aspect 15 where the locating a physical location of a speech source is based on detecting a maximum in a steered response power segment.

19. The electronic device of any of aspects 10 to 18 where the locating a physical location of a speech source is based on detecting a maximum in a steered response power segment and a stochastic region contraction.

20. The electronic device of any of aspects 10 to 19 where the locating a physical location of a speech source is based on detecting a maximum in a steered response power segment, a stochastic region contraction, and a video classifier.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A computer implemented method of controlling an electronic device in an absence of a physical contact with the electronic device, comprising:
    designating an interactive space into a virtual detection space and a blocking area;
    the blocking area designated to prevent the electronic device from tracking users and conveying audio and images captured by a camera and a microphone array;
    sampling an aural signal received by the microphone array correlated with a noise event within a virtual detection space of the camera;
    correlating a sample of the aural signal with attributes of a noise signal, wherein the correlating includes determining that a positive correlation level exceeds a predetermined threshold value;
    modeling spectral components of the sample aural signal correlated with the noise signal to generate a noise signal model for the virtual detection space captured by the camera;
    updating a background noise when a speech segment is undetected and when a measurement of the noise signal is at or below a median noise measurement in the virtual detection space;
    detecting a user's presence within the virtual detection space of the camera while the electronic device is in a standby state by detecting noise components within the virtual detection space by the noise signal model;
    transitioning the electronic device to an interactive state when the user's presence is detected;
    detecting speech segments in the detection space and converting the speech segments into electrical signals;
    converting the electrical signals into digital signals at periodic intervals;
    identifying the speech segments in the digital signals;
    attenuating an input comprising the audio and the images from the blocking area to render a conditioned signal;
    locating a physical location of a speech source generating the speech segments;

adjusting the camera automatically on the physical location of the speech source generating the speech segments;

and transmitting the conditioned signal to a remote destination.

2. The computer implemented method of claim 1 further comprising rendering an acknowledgement in response to a virtual detection via a speech synthesis engine.

3. The computer implemented method of claim 1, further comprising converting the digital signals into a plurality of cepstral coefficients and classifying the cepstral coefficients as a speech or the noise signal.

4. The computer implemented method of claim 3 further comprising identifying a human presence in response to processing the cepstral coefficients.

5. The computer implemented method of claim 1 where the speech segments are identified by correlating spectral shapes of the digital signals attributed with voiced and unvoiced speech.

6. The computer implemented method of claim 1 where the locating a physical location of the speech source comprises identifying a physical location through an acoustic localization based on a time difference of signal arrival between the microphones in the microphone array.

7. The computer implemented method of claim 6 where the locating the physical location of the speech source comprises a video localization executed by a video locator and an augmentor, the augmentor generating a bounding box that encloses a participant's head and further comprises:

extracting features of the participant from within the bounding box when a predicted score exceeds a predetermined threshold;

identifying the speech source by a classification that renders a highest confidence score;

and identifying the physical location of the speech source based on a relative position of the speech source to images of a plurality of objects captured by the camera.

8. The computer implemented method of claim 7 where the locating a physical location of a speech source is based on detecting a maximum in a steered response power segment, comprising:

generating cross-correlation and a phase transform values at a plurality of time delays associated with a sensing direction of a plurality of microphone pairs processing the aural signal;

and generating an image of reverberation effects within the interactive space;

where the phase transform determines a time difference of arrival of a signal between the microphone pair.

9. The computer implemented method of claim 6 where the locating the physical location of the speech source is based on detecting a maximum in a steered response power segment;

comprising:

generating a cross-correlation and phase transform values at a plurality of time delays associated with a sensing direction of a plurality of microphone pairs processing the aural signal;

where the phase transform determines a time difference of arrival of a signal between the microphone pair;

and generating an image showing reverberation effects within the interactive space.

10. An electronic device, comprising;

a display;

a processor in communication with the display;

and a computer program stored in a non-transitory memory executed by the processor that causes actions to be carried out through instructions for:

monitoring an interactive space comprising a detection space and a blocking area;

the blocking area prevents the electronic device from tracking users and conveying audio signals and images captured by a camera and a microphone array;

sampling an input signal received by the microphone array correlated with a noise event within a detection space of the camera;

correlating a sample of the input signal with attributes of an audio noise signal, wherein the correlating includes determining that a positive correlation level exceeds a predetermined threshold value;

modeling spectral components of the sample input signal to generate a noise signal model for the detection space captured by the camera;

updating a background noise measurement when a speech segment is undetected and only when a noise measurement of the noise signal is equal to or below an average noise measurement of a plurality of prior background noise measurements in the detection space;

detecting a user's presence within the detection space of the camera while the electronic device is in a standby state by detecting noise components within the detection space by the noise signal model;

transitioning the electronic device to an interactive state when the user's presence is detected within the detection space when noise components are detected within the detection space by the noise signal model;

detecting speech in the detection space and converting the speech into electrical signals;

converting the electrical signals into digital signals at periodic intervals;

identifying speech segments in the digital signals;

attenuating the noise components and an updated background noise measurement in the digital signals and aural signals and images from the blocking area to render a conditioned signal;

locating a physical location of a speech source generating the speech segments;

adjusting the camera automatically based on the physical location of the speech source generating the speech segments and a physical location of participants as participants enter or leave the detection space;

and transmitting the conditioned signal to a remote destination.

11. The electronic device of claim 10 further comprising instructions for rendering, via a speech synthesis engine, an acknowledgement in response to the detection of the user's presence identifying the physical location.

12. The electronic device of claim 10 further comprising instructions for converting the digital signals into a plurality of cepstral coefficients and classifying the cepstral coefficients as a speech or the noise signal.

13. The electronic device of claim 12 further comprising instructions that identify a human presence in response to processing the cepstral coefficients.

14. The electronic device of claim 10 where the speech segments are identified by correlating spectral shapes of the digital signals attributed with voiced and unvoiced speech.

15. The electronic device of claim 10 further comprising instructions where the locating the physical location of a speech source comprises an acoustic localization based on a signal latency received by a microphone pair executed by an acoustic locator.

16. The electronic device of claim 10 where the locating the physical location of a speech source comprises a video localization executed by a video locator and an augmentor, the augmentor generating a bounding box that encloses an active speaker's facial features further comprises:
  extracting the facial features from a bounding box when a predicted score exceeds a predetermined threshold;
  identifying an active speaker by a classification and confidence score;
  and identifying a physical location of the active speaker based on a relative position of the active speaker to images of a plurality of other objects captured by the camera in the interactive space.

17. The electronic device of claim 16 further comprising instructions for locating the physical location of the speech source based on detecting a maximum in a steered response power segment, comprising:
  generating a cross-correlation and phase transform values at a plurality of time delays associated with a sensing direction of a plurality of microphone pairs processing the aural signal;
  where the phase transform determines a time difference of arrival of a signal between the microphone pair;
  and generating an image showing reverberation effects within the interactive space.

18. The electronic device of claim 15 where the locating the physical location of a speech source is based on detecting a maximum in a steered response power segment.

19. The electronic device of claim 10 where the locating the physical location of a speech source is based on detecting a maximum in a steered response power segment and a stochastic region contraction.

20. The electronic device of claim 10 where the locating the physical location of a speech source is based on detecting a maximum in a steered response power segment, a stochastic region contraction, and a video classifier.

21. The electronic device of claim 10 further comprising monitoring the background noise by a microphone of the microphone array.

22. A computer implemented method of controlling an electronic device in an absence of a physical contact with the electronic device, comprising:
  designating an interactive space into a virtual detection space and a blocking area, wherein the blocking area prevents the electronic device from tracking users and conveying audio and images captured by a camera and a microphone array;
  sampling an aural signal received by the microphone array correlated with a noise event within a virtual detection space of the camera;
  correlating a sample of the aural signal with attributes of a noise signal, wherein the correlating includes determining that a positive correlation level exceeds a predetermined threshold value;
  modeling spectral components of the sample aural signal correlated with the noise signal to generate a noise signal model for the virtual detection space captured by the camera;
  updating a background noise when a speech segment is undetected and when a measurement of the noise signal is at or below a median noise measurement in the virtual detection space;
  detecting a user's presence within the virtual detection space of the camera while the electronic device is in a standby state by detecting noise components within the virtual detection space by the noise signal model;
  transitioning the electronic device to an interactive state when the user's presence is detected;
  detecting speech segments in the detection space and converting the speech segments into electrical signals;
  converting the electrical signals into digital signals at periodic intervals;
  identifying the speech segments in the digital signals;
  attenuating an input comprising the audio and the images from the blocking area to render a conditioned signal;
  locating a physical location of a speech source generating the speech segments;
  adjusting the camera automatically on the physical location of the speech source generating the speech segments;
  and transmitting the conditioned signal to a remote destination.

23. An electronic device, comprising;
  a display;
  a processor in communication with the display;
  and a computer program stored in a non-transitory memory executed by the processor that causes actions to be carried out through instructions for:
  monitoring an interactive space comprising a detection space and a blocking area, wherein the blocking area prevents the electronic device from tracking users and conveying audio signals and images captured by a camera and a microphone array;
  sampling an input signal received by the microphone array correlated with a noise event within a detection space of the camera;
  correlating a sample of the input signal with attributes of an audio noise signal, wherein the correlating includes determining that a positive correlation level exceeds a predetermined threshold value;
  modeling spectral components of the sample input signal to generate a noise signal model for the detection space captured by the camera;
  updating a background noise measurement when a speech segment is undetected and only when a noise measurement of the noise signal is equal to or below an average noise measurement of a plurality of prior background noise measurements in the detection space;
  detecting a user's presence within the detection space of the camera while the electronic device is in a standby state by detecting noise components within the detection space by the noise signal model;
  transitioning the electronic device to an interactive state when the user's presence is detected within the detection space when noise components are detected within the detection space by the noise signal model;
  detecting speech in the detection space and converting the speech into electrical signals;
  converting the electrical signals into digital signals at periodic intervals;
  identifying speech segments in the digital signals;
  attenuating the noise components and an updated background noise measurement from the digital signals and aural signals and images from the blocking area to render a conditioned signal;
  locating a physical location of a speech source generating the speech segments;
  adjusting the camera automatically based on the physical location of the speech source generating the speech segments and a physical location of participants as participants enter or leave the detection space;

and transmitting the conditioned signal to a remote destination.

\* \* \* \* \*